Nov. 27, 1951 — L. FRANKEL — 2,576,586

PROJECTION FILM VIEWER

Filed March 12, 1948 — 7 Sheets-Sheet 1

INVENTOR.
Leo Frankel
BY
McLaughlin & Wallenstein
Attys.

Nov. 27, 1951  L. FRANKEL  2,576,586
PROJECTION FILM VIEWER
Filed March 12, 1948  7 Sheets-Sheet 2

INVENTOR.
Leo Frankel
BY
McLaughlin Wallenstein
Attys.

Nov. 27, 1951  L. FRANKEL  2,576,586
PROJECTION FILM VIEWER
Filed March 12, 1948  7 Sheets-Sheet 3

INVENTOR.
Leo Frankel
BY
McLaughlin & Wallenstein
Attys.

Nov. 27, 1951     L. FRANKEL     2,576,586
PROJECTION FILM VIEWER
Filed March 12, 1948     7 Sheets-Sheet 4
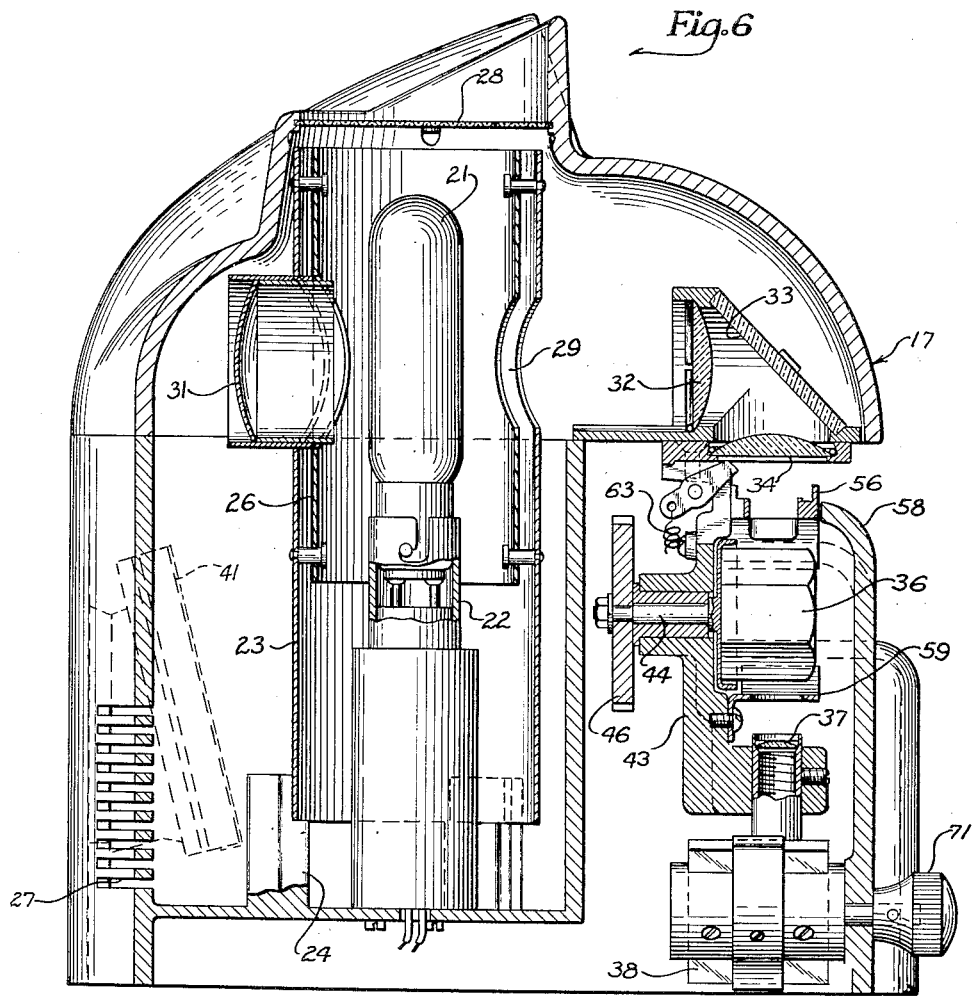
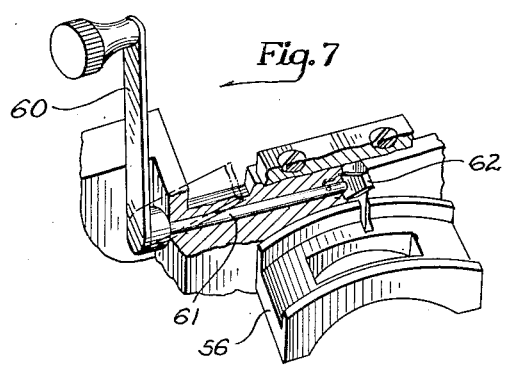
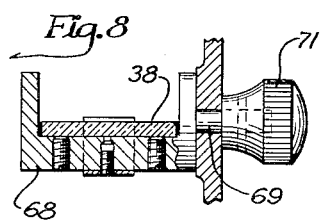
INVENTOR.
Leo Frankel Nov. 27, 1951 L. FRANKEL 2,576,586
PROJECTION FILM VIEWER
Filed March 12, 1948 7 Sheets-Sheet 5
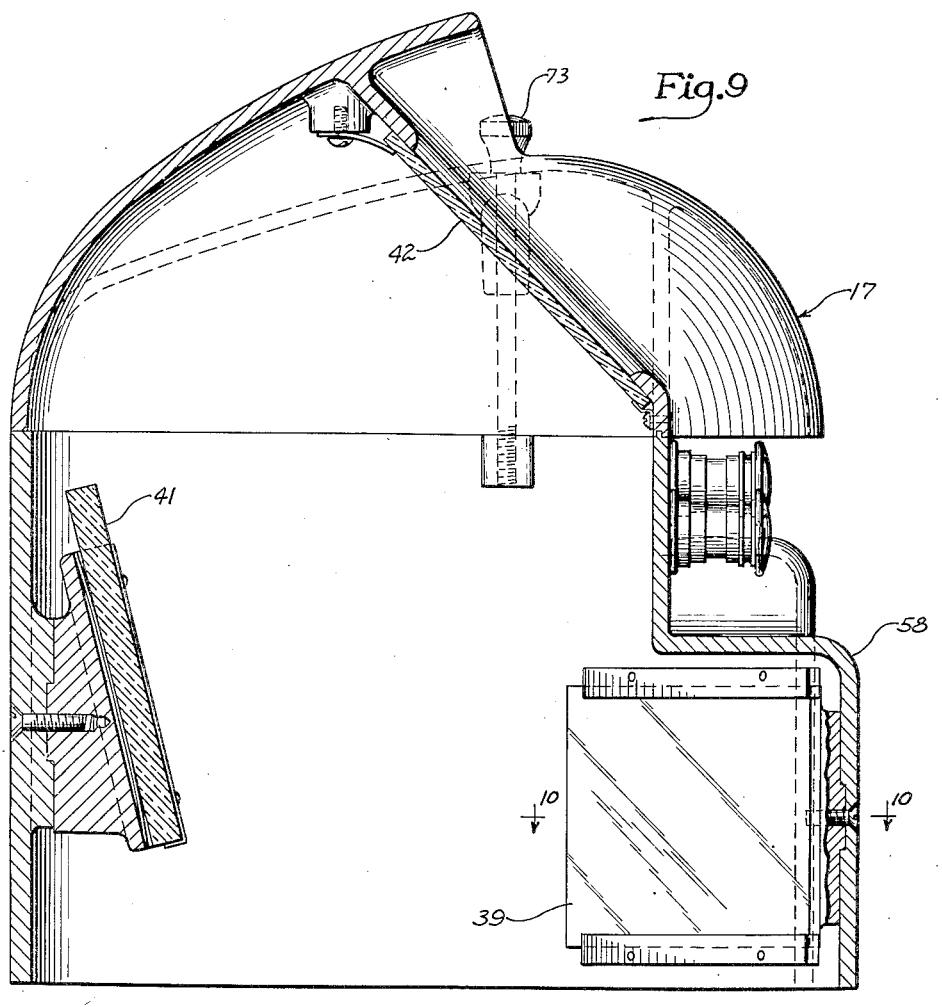
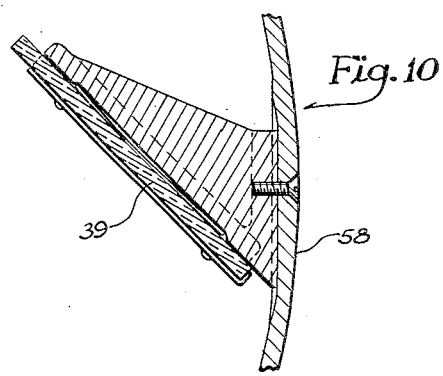
INVENTOR.
Leo Frankel
BY
McLaughlin & Walbuston
Attys.

Nov. 27, 1951 L. FRANKEL 2,576,586
PROJECTION FILM VIEWER
Filed March 12, 1948 7 Sheets-Sheet 6

INVENTOR.
Leo Frankel
BY
McLaughlin & Wallenstein
Attys.

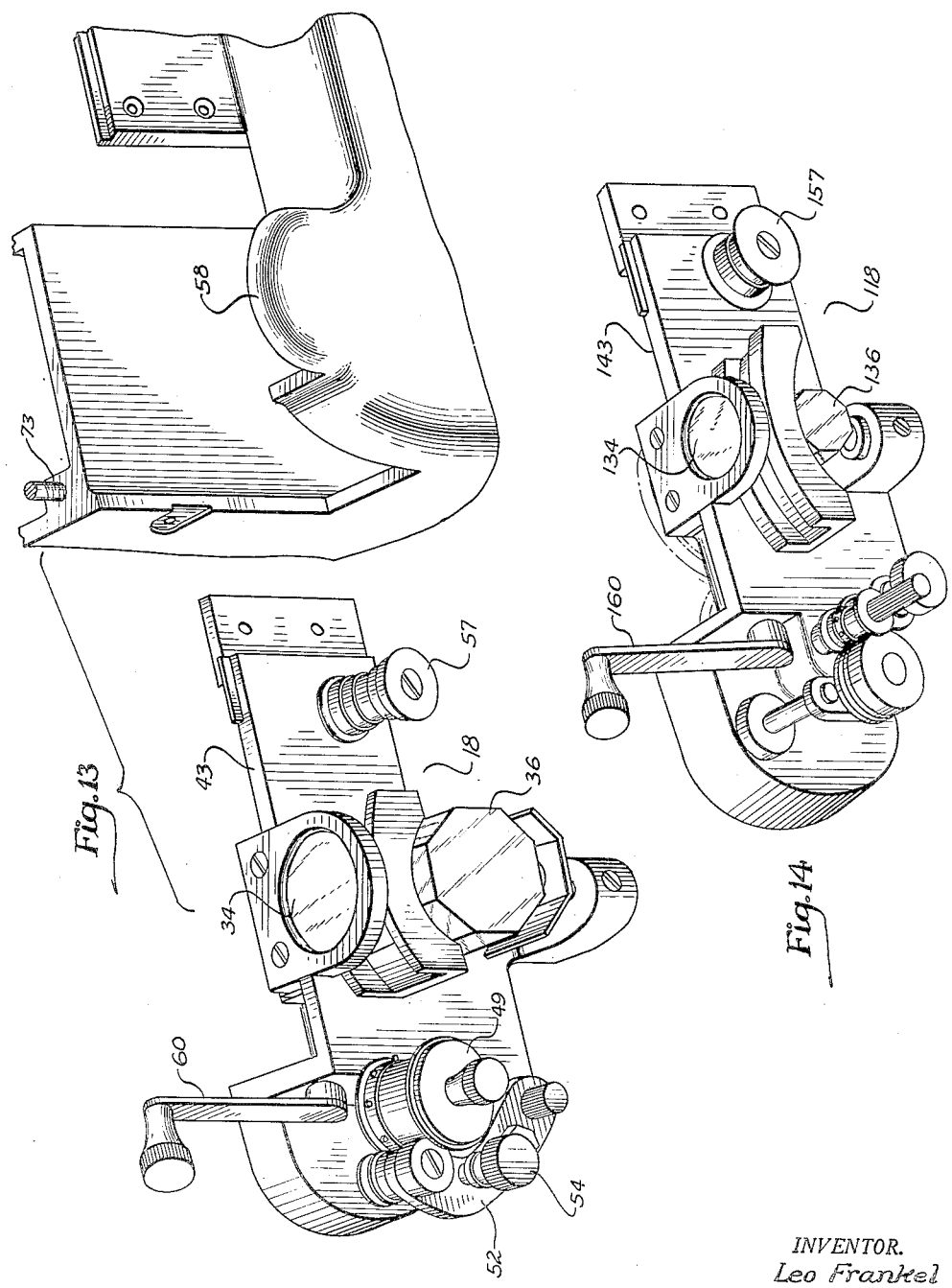

Patented Nov. 27, 1951

2,576,586

UNITED STATES PATENT OFFICE 2,576,586

PROJECTION FILM VIEWER

Leo Frankel, Chicago, Ill., assignor, by mesne assignments, to City National Bank and Trust Company of Chicago, as trustee Application March 12, 1948, Serial No. 14,405

1 Claim. (Cl. 88—16.8)

My invention relates to an improved viewer. It relates more in particular to a viewer which is readily adaptable for use with films of different film in connection with the procedure commonly sizes.

For the purpose of inspecting motion picture called editing, and for other purposes, it has become common practice to provide a device called a viewer in which the film is projected onto a relatively small ground glass screen immediately before the operator. Viewers are, in effect, miniature projectors but they should have, for satisfactory operation, features which are particularly advantageous in a viewing and editing operation but which are not necessary or of less importance in conventional projection. Important considerations in a viewer are inexpensiveness and convenience. Another desirable feature is a convenient means for satisfactorily marking a film at a spot which the operator for some reason or other will later wish to locate. I have also determined that it is highly advantageous to provide a viewer which is readily converted for operation on films of different sizes such as, for example, 8 mm., 9½ mm. or 16 mm. film, commonly used in the amateur field.

Detailed objects and features of the invention will be brought out in connection with the description of the embodiment of the invention shown in the drawings wherein—

Fig. 6 is a sectional view taken on the line 6—6 of Fig. 2 looking in the direction of the arrows;

Fig. 7 is a fragmentary perspective view with some of the parts broken away, illustrating the film notching mechanism;

Fig. 8 is a sectional view taken on the line 8—8 of Fig. 2, the view being on the same scale, however, as Figs. 5 and 6;

Fig. 9 is a sectional view having the same scale as that of Fig. 6 and taken on the line 9—9 of Fig. 2, looking in the direction of the arrows;

Fig. 10 is a sectional view taken on the line 10—10 of Fig. 9;

Fig. 13 is a fragmentary exploded perspective view showing a part of the housing but with a subassembly comprising an interchangeable part of the viewer removed therefrom; and Fig. 14 shows another subassembly for use with a smaller type of film than that for which the subassembly of Fig. 13 is used.

Figure 1:
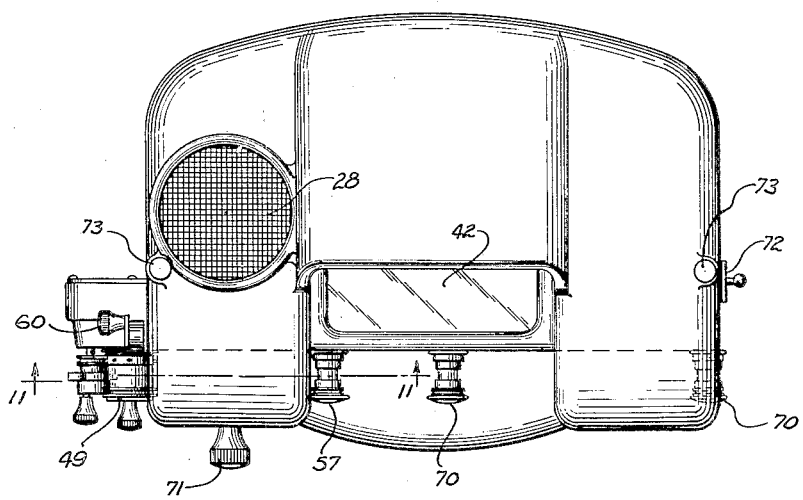
Fig. 1 is a plan view.

The viewer of my invention comprises three main subassemblies, namely, a housing subassembly 16, a housing cover subassembly 17, the two together forming a complete housing, and a subassembly 18 comprising certain optical and other parts as shown in Fig. 13. By means of the subassemblies comprising these parts, a complete viewer is produced in which pictures contained on a film pass through the viewer and are successively projected onto a screen carried by the housing cover. The entire device is so constructed and arranged that all of the parts required to be modified, to go from one film size to another, are part of the optical subassembly, the viewer otherwise remaining entirely unchanged when going from one size film to the other. The housing is closed at the bottom by a suitable panel (not shown) but in all other respects the details of construction of all of the parts are shown in the drawings.

Figure 11:
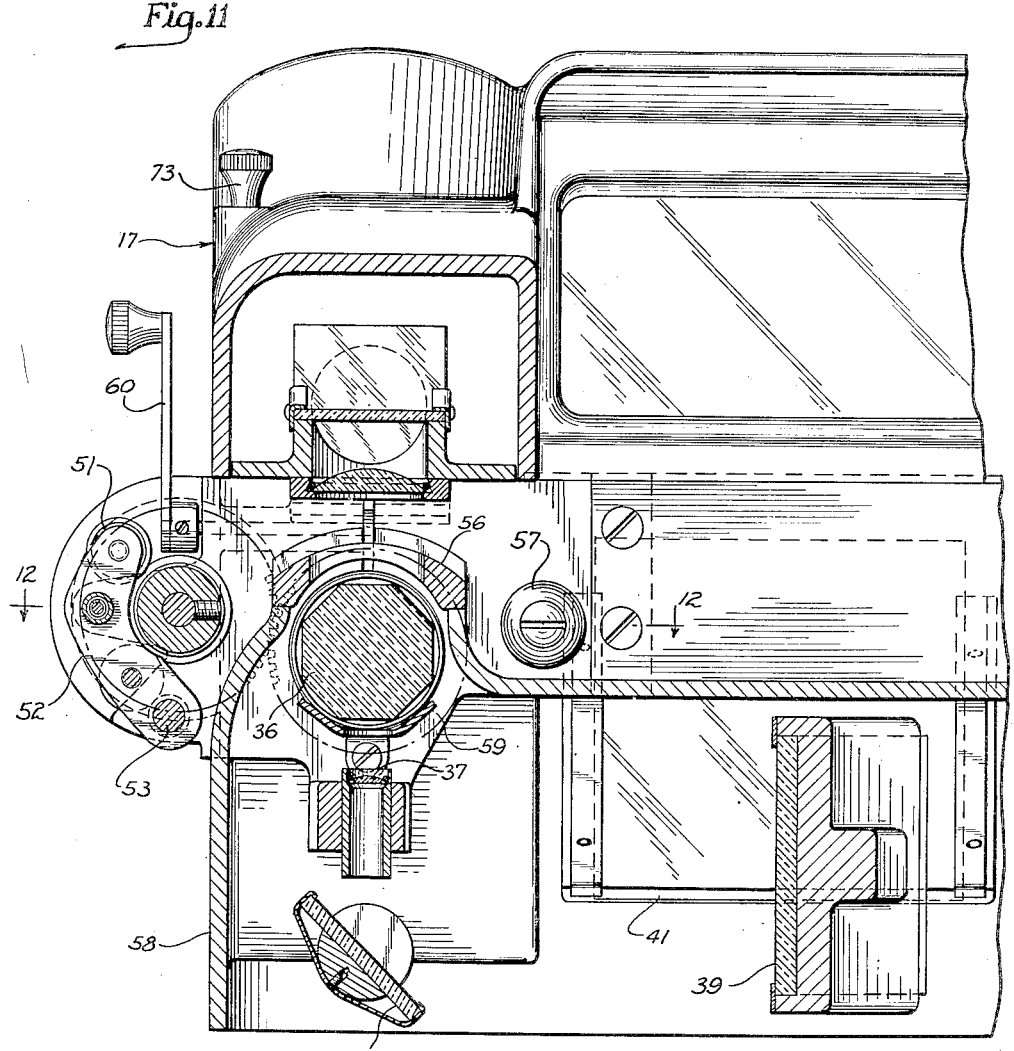
Fig. 11 is a fragmentary sectional view taken on the line 11—11 of Fig. 1.

Within the housing 16 is a lamp chamber 19 containing a projection lamp 21 suitably held in a socket 22. A tubular shell 23 surrounds the lamp and is supported between three uprights 24. An internal shell 26 is suitably spaced from the shell 23 as in the manner shown in Fig. 6. The housing cover subassembly 17 also has a partition (note Figs. 6 and 11, for example) which forms in the housing cover subassembly a continuation of the lamp chamber 19 into which the lamp and shells project. Grill-like openings 27 near the bottom of the lamp chamber and in the side wall of the housing provide for the admission of cooling air, and a grill-like cover 28 (see Fig. 1) in the housing cover subassembly provides for the escape of air which has passed between the lamp and tubular shells. The projection lamp is preferably of a type having a light opaque top so that ample cooling for the lamp is provided without light reflection from the top of the viewer.

Immediately in line with the lamp filament, the tubular shells 23 and 26 are apertured as shown at 29, in Fig. 6, and a mirror reflector 31 assists in delivering a maximum portion of the light to a lens 32 which is carried by the housing cover subassembly. From the lens 32, the light is delivered to a mirror 33 also carried by the housing cover assembly, and thence at right angles to a lens 34 carried by the subassembly 18. (The subassembly 18 may, for convenience, be called an optical subassembly, but it also carries a notching mechanism, as will be explained.) The lens 34 is, in effect, a projection lens, and delivers light to an octagonal optical prism 36 which, as shown, is rotated, and produces the same general effect as a shutter through the principle sometimes called "optical levelling" in a manner generally understood in the art. This mechanism and the manner of operating the same will be described, but first I wish to trace the remaining optical path to the viewing screen where the image is observed by the operator.

Below the optical prism is a fixed lens 37 comprising a part of the optical subassembly. From the lens 37, the light is delivered to an adjustable mirror 38, carried by the housing assembly, thence to fixed mirrors 39 and 41, also carried by the housing assembly, and thence to a ground glass screen 42 carried by the housing cover assembly.

Figure 12:
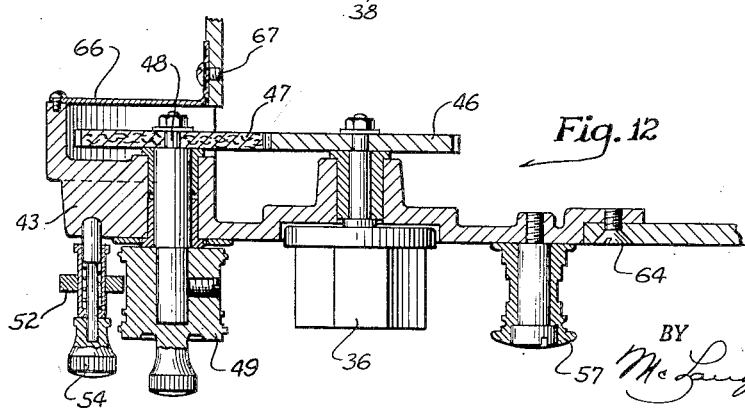
Fig. 12 is a fragmentary sectional view taken on the line 12—12 of Fig. 11.

The optical subassembly comprises a frame 43 in which a shaft 44 is suitably journalled. The forward end of the shaft carries the optical prism 36 and the inner end of the shaft carries a gear 46. The gear 46 meshes with a gear 47 carried on shaft 48, and shaft 48 carries on its forwardly projecting end a sprocket 49 (see Fig. 12). Thus, if sprocket 49 is rotated, the optical prism rotates with it at exactly the same rate because the gears 46 and 47 are of the same size. To hold the film in contact with a sprocket 49, I provide a keeper roller 51 (Fig. 11) mounted on an arm 52 which is pivoted at 53. A spring pressed plunger 54, also carried by the arm 52, is adapted to engage in an aperture provided in the frame 43; so that as the parts are brought to the position shown in Fig. 11, the spring pressed plunger may be engaged in the manner shown in Fig. 12, and the keeper roller 51 will be held against the sprocket 49 and maintain the film in contact with the sprocket. The sprocket, of course, has usual sprocket projections which engage in the perforations on the margin of the film.

Above the optical prism 36 and below the lens 34, and attached to the front of the frame 43, I provide a die cast film track 56 which performs several functions. It provides a fixed positioning track for the film between the sprocket 49 and a roller 57, and also provides a central opening in the nature of a gate through which light passes from the lens 34 to the optical prism. It will be noted, by reference particularly to Figs. 6 and 13, that the housing has a rounded portion 58 for receiving the optical prism and the member 56 closes the housing in the region of the rounded portion 58 so that light will not be reflected from the housing except through the opening in the member 56. There is little direct reflection of light, therefore, into the eyes of the observer when sitting directly in front of the viewer. Immediately below the optical prism is a light shield 59 apertured to pass light to the lens 37, but having the effect of preventing stray light from being reflected into the lens 37.

To the left of the member 56, the optical subassembly carries a lever arm 60 which is secured to one end of a transverse shaft 61 journalled in the frame 43. (See particularly Fig. 7.) The opposite end of the shaft 61 carries a notching tool 62 which moves in a slot or kerf in the frame 43 and adjacent portion of the member 56. A spring 63 (Fig. 6) normally holds the notching tool 62 and lever arm 59 in an elevated position. When the latter is moved forwardly, however, it carries the notching tool through the kerf in the die cast member 56 and notches a picture exactly in line with the view thereof on the screen 33.

Figure 2:
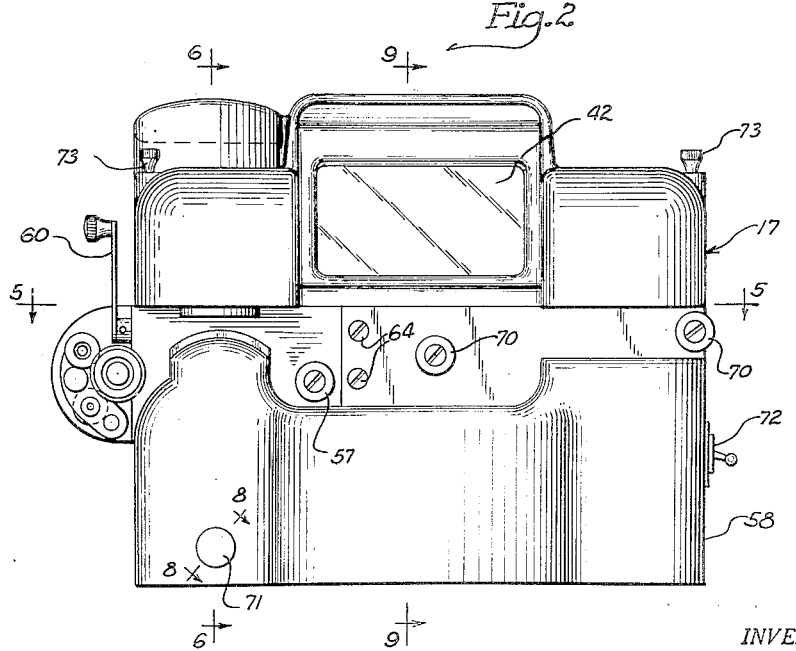
Fig. 2 is a front elevational view.
Figure 3:
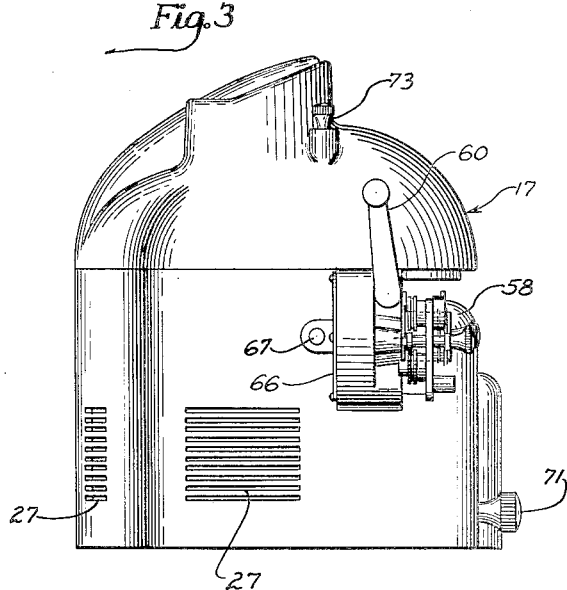
Fig. 3 is a side view, looking at the left hand side of the viewer as it appears in Figs. 1 and 2.
Figure 4:
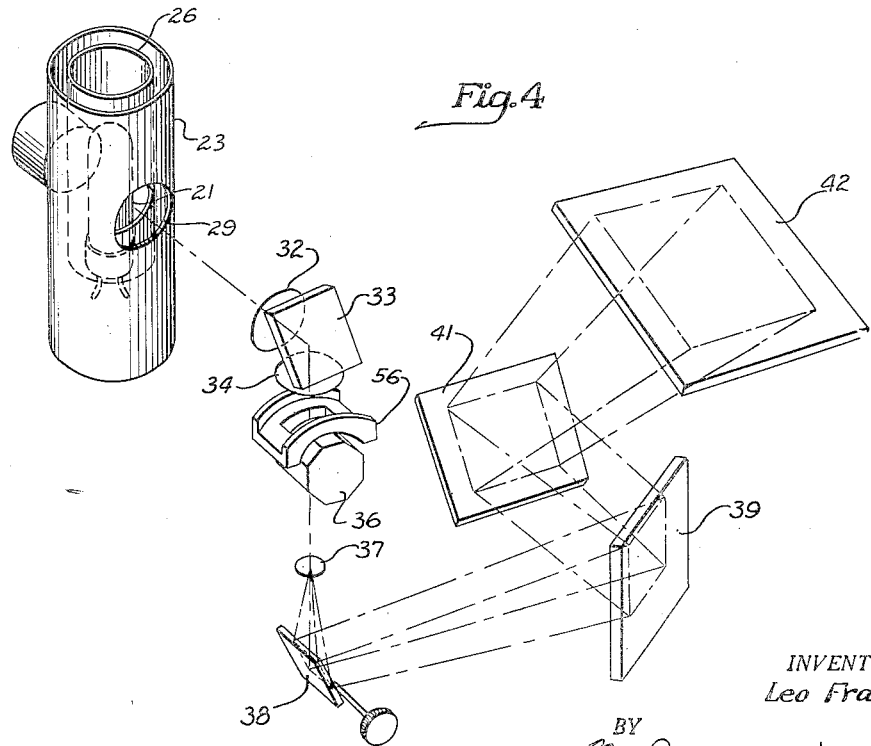
Fig. 4 is a schematic view showing some of the parts comprising the optical system and illustrating the path of the light beam from the lamp to the viewer screen.

The optical subassembly slides between the housing and housing cover assemblies and is secured in position to form a complete viewer. As shown particularly in Figs. 2, 11 and 13, the frame 43 is offset so that a portion thereof engages behind the end edge of the cut away portion of the housing (note particularly the right hand side of Fig. 13), and screws 64 are used to secure the frame 43 and housing together. At the side of the viewer, a cover plate 66 has an offset portion which is secured to the housing by a machine screw 67 (Fig. 3). The frame 43 and cover plate 66 together form a continuation of the housing.

Figure 5:
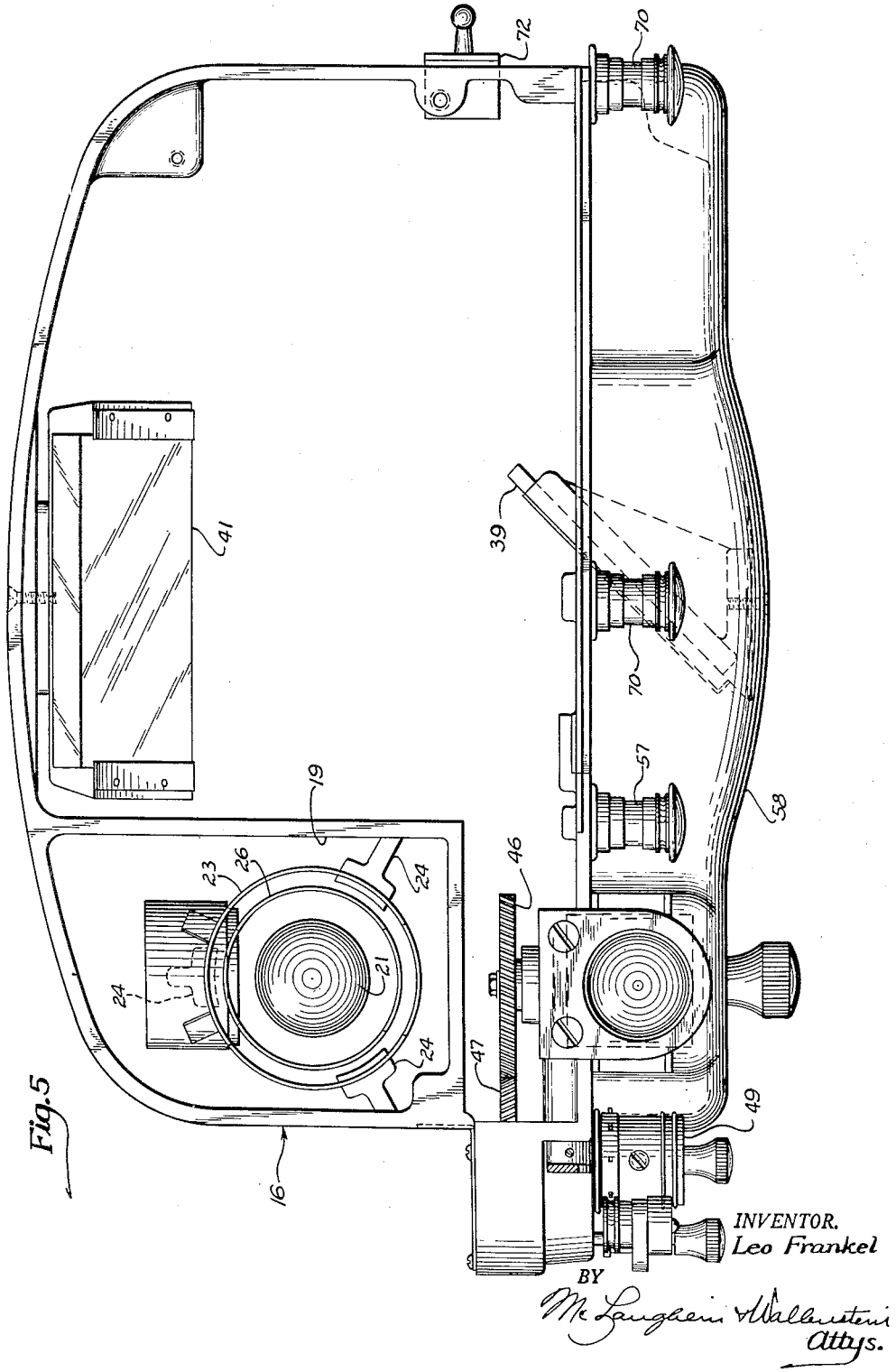
Fig. 5 is a plan sectional view with the upper part of the housing removed, the view being taken substantially along the line 5—5 of Fig. 2 looking in the direction of the arrows and showing the parts substantially in full size.

It has already been noted that the light passes from lens 37 to the adjustable mirror 38 and thence through mirrors 39 and 41 to the screen 42. The mirrors 39 and 41 and the screen 42 are so adjusted during the process of manufacture that an image suitably directed to the mirror 39 will appear in proper position for inspection on the screen 42. By reference to Figs. 5, 9, and 10, it will be seen that means may readily be provided for simple and expeditious assembly of the parts concerned in their proper relationship. The mirror 38, however, is mounted on a cradle 68, carried on a shaft 69, which shaft is journalled in the housing and has an adjusting knob 71 exterior of the housing. By rotating the knob 71, the mirror 38 may be tilted around the axis of shaft 69. The effect is to raise or lower the position which the image occupies on the mirrors 39 and 41 and the screen 42. The action is to frame the picture in a direction longitudinally of the film strip, it being obvious that the position of the picture transversely of the film strip is fixed. By this means, the picture may be centered on the screen 32 regardless of how far it may be off because of peculiarities in the camera taking the picture or for any other reason.

The roller 57, heretofore referred to, is carried by the frame 43 on the optical subassembly, and similar rollers 70 are also carried by the housing assembly 16. The rollers 70 are of a type to accommodate themselves to different size film, but the roller 57 is preferably designed for the particular film to be used with the optical subassembly. While the viewer disclosed remains cool and there is no danger of burning film regardless of how long the film may remain stationary at a particular picture, I have, nevertheless, found it a great convenience to provide a switch 72 which controls the current to the lamp 21.

I have already referred to the provision of three subassemblies, which, when assembled together, complete the viewer. I find that the housing cover assembly may, to advantage, be removed as a unit for the purpose of replacing a projection lamp or for any other reason, including replacement of the optical subassembly, and, to this end, I preferably provide, as the only means of securing the housing cover assembly to the housing assembly, a pair of long thumb screws 73 which extend through the housing cover and into threaded bosses on the housing. At least a portion of the peripheries of the housing and housing cover are grooved, as indicated in Fig. 9, to positively position the two parts with respect to each other, the thumb screws thereby having only the function of attachment.

The optical subassembly, as previously noted, is interchangeable with another optical subassembly and I indicate such assembly by the reference character 118 in Fig. 14 and since the actual parts are of the same character although differently designed, I have, for convenience, applied the same reference characters to Fig. 14 with, however, the prefix "1" to show modification. It will be understood, however, that Fig. 14, in a true sense, does not show a modification, but that the actual subassembly of Fig. 14 may be substituted for the optical subassembly 18 without any change whatsoever in adjustment, relationship or disposition of parts, in other subassemblies of the viewer.

It will thus be seen that the viewer of my invention can be considered as comprising an assembly of a housing, including a housing cover subassembly, containing a projection lamp with reflector, shield, cooling mechanism, etc., a condenser lens, four mirrors, one of them adjustable for framing, and a viewing screen, all having fixed positions and designed to cooperate with the portion of the viewer forming the optical subassembly, so that the optical subassemblies, when properly engineered, can be assembled at will with the housing assembly and a completed viewer produced. It will be noted that in the optical subassemblies the lenses 34 and 37 are of a different size and spaced differently in accordance with their focal length and their relation to the optical prism. The optical prism and film track 56 are engineered to accommodate themselves to a particular size of film. In Figs. 13 and 14, for example, the parts are of substantially the identical size provided for 16 mm. and 8 mm. film, respectively. The sprocket 49 is also designed for a particular size film, but the drive from the sprocket to the optical prism being a direct ratio drive, the gears 46 and 47 may be identical in the two subassemblies. The frames of the optical subassemblies are identical so far as those parts are concerned which are attached to the housing, but they vary in so far as is required for support of the apparatus thereon.

In using the viewer of my invention, an optical subassembly is assembled to the housing assembly, corresponding to the motion picture film which it is desired to use in the viewer. The viewer is placed on a suitable mount and means is preferably provided for advancing the film, such as the usual rewinds employed for winding and unwinding film from spools. The film is threaded over the keeper roller 51, beneath the sprocket 49, over the film track 56 and under the roller 57, care being taken to engage the keeper roller against the sprocket so that the film is caused to remain in engagement with the sprocket. The projection lamp is lighted by turning on the switch 72 and the film is advanced or moved in whatever manner may be desired for inspection of the same. The film may be run frontwards or backwards, however, if, for any reason, it is desirable to backtrack for inspection purposes. Even at relatively slow speeds, pictures are presented on the screen 42 in proper projection sequence without flicker. Notwithstanding the fact that I provide a readily operable housing and optical subassembly, the parts are so arranged that there is no reflection of glaring light to the eyes of the operator. The viewer remains relatively cool and there is no tendency to reflect heat into the face of the user, even after long operation. When the operator wishes to mark a film, for any purpose, he stops it at the exact point which he wishes to mark and pulls the lever 60 forwardly to thus notch the edge of the film at exactly the point in the film selected by reference to the screen 42. I have already referred to the ability to exactly frame the picture, a desirable feature which I have been able to include notwithstanding the adjustability for various film sizes.

If it is desired to clean any of the optical parts, the thumb screws 73 are removed and the housing cover lifted. This immediately makes available for inspection or service all of the optical parts except the optical prism and lower projection lens. To make these parts available for inspection or service, the optical subassembly is removed simply and expeditiously. All of the parts are readily returned to their normal positions and there is no possibility of assembling so as to disturb the exact adjustment of the optical parts.

If it is desired to go from one film size to another as, for example, from 16 mm. to 8 mm., the same procedure is followed, but in reassembling the optical subassembly 118 is substituted for the optical subassembly 18. All that is necessary is to operate the viewer with the smaller film size exactly as it was being operated with the larger film. The viewer is designed so that regardless of the size of the picture the screen is filled, and the same light intensity is maintained, with the picture on the screen of the same size in each instance. With this arrangement, in the case of the 16 mm. film there is less enlargement, but the size in either instance is more than ample for viewing purposes.

While there are definite advantages in the use of a housing and cover arrangement separable along a generally horizontal line, as shown in the drawings, those skilled in the art will understand that any construction which provides for an optical assembly to be inserted in the wall of a housing and in which the several projector parts are so arranged that the size of film accommodated is determined solely by the parts carried by the optical assembly, can be utilized for securing the objects of my invention. Advantageously, the notching mechanism is part of the optical assembly, but separate notching or marking means can, of course, be employed as those skilled in the art understand.

I have described my invention in detail but the scope thereof is defined in the claim.

What I claim as new and desire to protect by Letters Patent of the United States is:

A projector viewer of the character described, comprising a housing assembly, a housing cover assembly and an optical assembly, together forming a complete viewer, a projection lamp carried by the housing and extending up into the said cover, a single condenser lens and mirror carried by the cover receiving light from the said projection lamp and directing the same downwardly, a second condenser lens carried by the said optical assembly, a film track with a gate aperture on the optical assembly below the second-mentioned condenser lens, a rotatably supported optical prism below said gate aperture, an objective lens carried by the optical assembly, a tiltable mirror carried by the housing assembly and receiving light from the said objective lens, a screen carried by the cover assembly, two additional mirrors carried by the housing assembly positioned to receive light from the said tilting mirror and projecting the same onto said screen, a sprocket rotatably supported by the optical assembly and having a direct gear drive connection to said optical prism, and roller means carried by said housing and shaped to accommodate themselves to different sizes of film, the said optical assembly being supported between the said cover assembly and housing assembly, the construction and arrangement being such that only the said optical assembly is required to be replaced to accommodate the viewer to films of different size, and the said tiltable mirror having the function of framing film pictures on the screen.

LEO FRANKEL.

REFERENCES CITED

The following references are of record in the file of this patent:

UNITED STATES PATENTS

| Number | Name | Date |
|---|---|---|
| 1,807,737 | Goldhammer | June 2, 1931 |
| 1,956,391 | Kuppenbender et al. | Apr. 24, 1934 |
| 2,087,250 | Foster | July 20, 1937 |
| 2,278,781 | Harrison | Apr. 7, 1942 |
| 2,285,644 | Bernzott | June 9, 1942 |
| 2,297,222 | Kemma | Sept. 29, 1942 |
| 2,381,997 | Bolsey | Aug. 14, 1945 |
| 2,422,816 | Baia | June 24, 1947 |

FOREIGN PATENTS

| Number | Country | Date |
|---|---|---|
| 385,377 | Great Britain | Dec. 29, 1932 |